US011087457B1

(12) United States Patent
Weinschenk et al.

(10) Patent No.: US 11,087,457 B1
(45) Date of Patent: Aug. 10, 2021

(54) DIGITAL PROJECTION SYSTEM AND ASSOCIATED METHOD

(71) Applicant: Wein Holding LLC, Rochester, MN (US)

(72) Inventors: Steven R. Weinschenk, Rochester, MN (US); Leo Passov, Rochester, MN (US)

(73) Assignee: Wein Holding LLC, Rochester, MN (US)

(*) Notice: Subject to any disclaimer, the term of this patent is extended or adjusted under 35 U.S.C. 154(b) by 0 days.

(21) Appl. No.: 16/897,099

(22) Filed: Jun. 9, 2020

Related U.S. Application Data

(63) Continuation of application No. 16/279,968, filed on Feb. 19, 2019, now Pat. No. 10,706,532, which is a
(Continued)

(51) Int. Cl.
*G06T 7/00* (2017.01)
*G01B 11/26* (2006.01)
(Continued)

(52) U.S. Cl.
CPC .............. *G06T 7/001* (2013.01); *G01B 11/26* (2013.01); *G06T 7/60* (2013.01); *H04N 9/3185* (2013.01);
(Continued)

(58) Field of Classification Search
CPC ...................................................... G06T 7/001
(Continued)

(56) References Cited

U.S. PATENT DOCUMENTS 1,804,764 A 5/1931 Grant
1,916,567 A 7/1933 Grant
(Continued)

FOREIGN PATENT DOCUMENTS

CN 202899636 U 4/2013

OTHER PUBLICATIONS

Weinmann Holzbausystemtechnik Gmbh, "WHP 100 Robotic Material Handling Portal", "Structural Building Components Magazine, downloaded from: http://www.sbcmag.info/sites/default/files/Archive/2008/sep/0809_cc.pdf", Sep./Oct. 2008.
(Continued)

*Primary Examiner* — Yulin Sun
(74) *Attorney, Agent, or Firm* — Charles A. Lemaire; Jonathan M. Rixen; Lemaire Patent Law Firm, P.L.L.C.

(57) ABSTRACT

A method and apparatus for assembling components of a workpiece. Some embodiments include a work surface; a first digital projector that projects an image of at least some features of the workpiece onto the work surface, wherein the image includes a plurality of line indicators that have visually discernible different markings such as colors or line types; a camera that obtains input images of the work surface and the components of the workpiece; and a first controller configured to receive the input images from the camera and to control the first digital projector to project the first output digital image on the work surface for assembly of the components to form the workpiece, wherein the first controller is further configured to store distortion-correction parameters and to use the stored distortion-correction parameters to adjust the first projected output digital image. In some embodiments, the workpiece is a lumber truss.

20 Claims, 8 Drawing Sheets

Related U.S. Application Data continuation of application No. 15/093,732, filed on Apr. 7, 2016, now Pat. No. 10,210,607.

(60) Provisional application No. 62/144,859, filed on Apr. 8, 2015.

(51) Int. Cl.
*H04N 9/31* (2006.01)
*G06T 7/60* (2017.01)

(52) U.S. Cl.
CPC . *H04N 9/3194* (2013.01); *G06T 2207/30164* (2013.01); *G06T 2207/30168* (2013.01); *G06T 2207/30204* (2013.01)

(58) Field of Classification Search
USPC ........................................................ 348/136
See application file for complete search history.

(56) References Cited

U.S. PATENT DOCUMENTS

| | | | |
|---|---|---|---|
| 2,510,471 A | 6/1950 | Horstkotte | |
| 2,806,492 A | 9/1957 | Becker | |
| 3,124,181 A | 3/1964 | Clemans | |
| 3,815,738 A | 6/1974 | Sweet et al. | |
| 4,139,035 A | 2/1979 | Bystedt et al. | |
| 4,196,648 A | 4/1980 | Jones et al. | |
| 4,867,213 A | 9/1989 | Bolton et al. | |
| 4,909,112 A | 3/1990 | Rosenthal | |
| 4,951,215 A | 8/1990 | Scherer | |
| 4,992,949 A | 2/1991 | Arden | |
| 5,090,804 A | 2/1992 | Wong et al. | |
| 5,335,790 A | 8/1994 | Geiger et al. | |
| 5,564,573 A | 10/1996 | Palm et al. | |
| 5,757,500 A | 5/1998 | Rueb | |
| 5,889,582 A | 3/1999 | Wong et al. | |
| 5,957,559 A | 9/1999 | Rueb et al. | |
| 6,011,255 A | 1/2000 | Rueb et al. | |
| 6,036,319 A | 3/2000 | Rueb et al. | |
| 6,050,693 A | 4/2000 | Rueb et al. | |
| 6,066,845 A | 5/2000 | Rueb et al. | |
| 6,170,163 B1 | 1/2001 | Bordignon et al. | |
| 6,347,259 B1 | 2/2002 | Goldenberg et al. | |
| 6,353,774 B1 | 3/2002 | Goldenberg et al. | |
| 6,864,460 B2 | 3/2005 | Cummings et al. | |
| 6,923,614 B2 | 8/2005 | Aylsworth | |
| 7,244,029 B2 | 7/2007 | Goik et al. | |
| 7,385,180 B2 | 6/2008 | Rueb et al. | |
| 7,463,368 B2 | 12/2008 | Morden et al. | |
| 7,621,053 B2 | 11/2009 | Bianchin | |
| 7,801,637 B2 | 9/2010 | Sander | |
| 7,832,875 B2 | 11/2010 | Matic-Vujovic et al. | |
| 7,950,316 B2 | 5/2011 | Koskovich | |
| 8,010,216 B2 | 8/2011 | Roise | |
| 8,079,579 B2 | 12/2011 | Fredrickson et al. | |
| 8,782,878 B2 | 7/2014 | Morden et al. | |
| 8,919,001 B2 | 12/2014 | Le Mer et al. | |
| 8,960,244 B1 | 2/2015 | Aylsworth et al. | |
| 9,200,899 B2 | 12/2015 | Rueb | |
| 9,245,062 B2 | 1/2016 | Rueb | |
| 9,316,506 B2 | 4/2016 | Aspen | |
| 9,369,632 B2 | 6/2016 | Short | |
| 9,442,075 B2 | 9/2016 | Rueb | |
| 9,881,383 B2 | 1/2018 | Rueb | |
| 10,080,003 B2 | 9/2018 | Tone | |
| 10,239,224 B2 | 3/2019 | Aylsworth | |
| 10,421,209 B2 | 9/2019 | Aylsworth | |
| 10,525,587 B2 | 1/2020 | Aylsworth | |
| 2005/0013472 A1 | 1/2005 | Gauthier | |
| 2005/0027389 A1 | 2/2005 | Hadaway et al. | |
| 2008/0223768 A1 | 9/2008 | Ahrens | |
| 2008/0297740 A1 | 12/2008 | Huynh et al. | |
| 2010/0100313 A1* | 4/2010 | Aspen | G08G 5/0021 701/532 |
| 2010/0201702 A1 | 8/2010 | Franik et al. | |
| 2014/0139717 A1* | 5/2014 | Short | H04N 9/3179 348/333.1 |
| 2014/0341444 A1 | 11/2014 | Hou et al. | |
| 2014/0347473 A1* | 11/2014 | Wolff | G06T 5/005 348/135 |
| 2015/0054792 A1* | 2/2015 | Kuki | G06F 3/0325 345/175 |
| 2015/0213606 A1* | 7/2015 | Akopyan | G01S 17/48 348/46 |
| 2015/0215592 A1* | 7/2015 | Tone | H04N 9/3155 348/744 |
| 2017/0274489 A1 | 9/2017 | Baratta | |
| 2017/0305029 A1 | 10/2017 | Aylsworth | |
| 2018/0001508 A1 | 1/2018 | Aylsworth | |

OTHER PUBLICATIONS

Weinmann Holzbausystemtechnik Gmbh, "Carpentry machines WBS and WBZ", "Downloaded from internet: http://www.homag.com/fileadmin/product/houseconstruction/brochures/weinmann-carpentry-machines-WBS-and-WBZ-english.pdf", May 2016, Publisher: Publication at least as early May 2016.

* cited by examiner

DIGITAL PROJECTION SYSTEM AND ASSOCIATED METHOD

CROSS-REFERENCE TO RELATED APPLICATIONS

This application is a continuation of U.S. patent application Ser. No. 16/279,968, filed Feb. 19, 2019 by Steven R. Weinschenk et al., titled "DIGITAL PROJECTION SYSTEM FOR WORKPIECE ASSEMBLY AND ASSOCIATED METHOD" (which issued as U.S. Pat. No. 10,706,532 on Jul. 7, 2020), which is a continuation of U.S. patent application Ser. No. 15/093,732, filed Apr. 7, 2016 by Steven R. Weinschenk et al., titled "DIGITAL PROJECTION SYSTEM AND METHOD FOR WORKPIECE ASSEMBLY" (which issued as U.S. Pat. No. 10,210,607 on Feb. 19, 2019), which claims priority benefit, under 35 U.S.C. § 119(e), of U.S. Provisional Patent Application No. 62/144,859, filed Apr. 8, 2015 by Steven Weinschenk, titled "DIGITAL PROJECTION SYSTEM AND METHOD FOR WORKPIECE ASSEMBLY," each of which is incorporated herein by reference in its entirety.

FIELD OF THE INVENTION

The present invention relates to the field of workpiece assembly, and more specifically to digital projection systems and methods for workpiece assembly.

BACKGROUND OF THE INVENTION

U.S. Pat. No. 6,170,163 to Robert A. Bordignon et al. (hereinafter, "Bordignon et al."), titled "METHOD OF ASSEMBLING COMPONENTS OF AN ASSEMBLY USING A LASER IMAGE SYSTEM," issued Jan. 9, 2001, and is incorporated herein by reference. Bordignon et al. describe a method of assembling components of an assembly, such as the components of a truss, using a laser imaging system in combination with assembly jigs. The jigs may be slidably mounted on an assembly table wherein the jigs include laser alignment indicia on a top surface of the jigs spaced a predetermined distance from a side surface of the jigs. The method includes projecting an enlarged laser generated outline of at least a portion of the components to be assembled which is spaced laterally from an outline or template of the components in the assembled position a distance equal to the distance between the laser alignment indicia and the side surface of the jigs and spaced vertically a distance equal to the distance between the indicia and the work surface. The jigs are then moved on the work surface to align the laser alignment indicia with the enlarged outline and affixed relative to the work surface. Finally, the components are assembled on the work surface in generally abutting relation with the side surfaces of the jigs and assembled. Where the assembly method of this invention is used for assembling trusses, the laser generated outline may be used to orient the truss planks.

U.S. Pat. No. 7,463,368 to Jarrad V. Morden et al. (hereinafter, "Morden et al."), titled "LASER PROJECTION SYSTEM, INTELLIGENT DATA CORRECTION SYSTEM AND METHOD," issued Dec. 9, 2008, and is incorporated herein by reference. Morden et al. describe a laser projection system, intelligent data correction system and method which corrects for differences between the as-built condition and the as-designed condition of a workpiece which includes determining the as-built condition of a workpiece with a digitizer scanner and modifying data of the as-built condition or the data of a laser projection based upon the data received from the digitizer scanner of the as-built condition. A preferred intelligent data correction system includes metrology receivers fixed relative to the digitizer scanner and the workpiece and a metrology transmitter to determine the precise location and orientation of the digitizer scanner relative to the workpiece.

U.S. Pat. No. 7,621,053 to Edward S. Bianchin (hereinafter, "Bianchin"), titled "ASSEMBLY APPARATUS," issued Nov. 24, 2009, and is incorporated herein by reference. Bianchin describes an assembly apparatus for assembling components including a work surface, a laser projector, a computer controlling the laser projector to protect a laser image on the work surface, and an ejector lifting a completed assembly from the work surface having a retro-reflective surface within a field of view of the laser projector when the ejector is lifted, such that the laser projector scans the retro-reflective surface and the computer determines at least one of the number of completed assemblies made and the time required to make the assembly.

United States Patent Publication 2010/0201702 of Franik et al. published Aug. 12, 2010 with the title "DIGITAL IMAGE PROJECTION LUMINAIRE SYSTEMS," and is incorporated herein by reference. This publication describes improvements to digital image projection systems and for seamless blending of images projected from a plurality of digital image projectors to create combined images from multiple projectors where the user is provided with independent control of the blend area and of independent control of image parameters within said variable blend area such as brightness, contrast, individual color intensity and gamma correction.

U.S. Pat. No. 8,079,579 to Fredrickson et al. (hereinafter, "Fredrickson et al."), titled "Automatic truss jig setting system," issued Dec. 20, 2011, and is incorporated herein by reference. Fredrickson et al. describe an automatic truss jig setting system that includes a table including a plurality of segments with a side edge of adjacent segments defining a slot. At least one pin assembly, and optionally a pair of pin assemblies, is movable independently of each other along the slot. Movement apparatus is provided for independently moving the pin assemblies along the slot. Each of the side edges of the segments associated with the slot defines a substantially vertical plane with a zone being defined between the substantially vertical planes of the side edges, and the movement apparatus is located substantially outside of the zone of the slot. The invention may optionally include a system for handling the obstruction of pin assembly movement, and a system for keeping track of the position of the pin assembly when the pin assembly has encountered an obstruction.

U.S. Pat. No. 8,782,878 to Jarrad V. Morden et al., titled "FASTENER AUTOMATION SYSTEM," issued Jul. 22, 2014, and is incorporated herein by reference. In this patent, Morden et al. describe a fastener automation system for assembly of fasteners to a substrate, which includes a projection system for projecting an image on a substrate of a predetermined location of a correct fastener to be installed in the substrate and data relating to the correct fastener and the substrate, and a computer operably associated with the projection system storing data regarding the correct fastener and the predetermined location on the substrate where the correct fastener is to be installed. An automated method of installing a fastener in a substrate at a predetermined location includes using a projector system to identify a predetermined location for installation of a correct fastener to the substrate, collecting data regarding the correct fastener installation at the predetermined location and storing the data in a computer, and installing the correct fastener in the substrate at the predetermined location based upon the data.

United States Patent Publication 2008/0297740 of Huynh et al. published Dec. 4, 2008 with the title "Projection system and method of use thereof," and is incorporated herein by reference. This publication describes a projection system and method of use thereof, wherein a computer in electrical communication with at least one projector projects a layout, preferably onto a floor projection surface utilizing short throw lenses, wherein the layout preferably comprises a grid and indicia relating to an exhibitor.

U.S. Pat. No. 8,919,001 to Erwan Le Mer et al. (hereinafter, "Le Mer et al."), titled "METHOD AND SYSTEM FOR HELPING TO POSITION A COMPONENT ON A STRUCTURAL ELEMENT," issued Dec. 30, 2014, and is incorporated herein by reference. Le Mer et al. describe a method for helping to position a component on the wall of a structural element, including the steps: elaborating an image to be projected on the wall, from a virtual model of the structure and from the positioning of a projector with respect to the structure, and an additional motif providing positioning information of the piece with respect to the direction normal to the wall, projecting the image on the structural element by means of the projector; placing the base of the piece inside an outline of the image projected on the wall; and, while keeping contact between the piece and the structural element, modifying the positioning of the piece with respect to the direction normal to the wall, until the predefined set of points of the piece coincides with the motif.

Chinese Patent Publication CN 202899636 U published Apr. 24, 2013 with the title "Discrete assembly device for large-span rectangular spatially warped tube truss," and is incorporated herein by reference. This publication describes a discrete assembly device for a large-span rectangular spatially warped tube truss. The device consists of a base, two supporting tubes fixedly connected to the two sides of the base, and tube brackets fixedly connected to the tops of the supporting tubes, wherein grooves of which the diameter is matched with that of a lower chord of an assembly section truss are formed on the tube brackets. The on-site assembly difficulty of the large-span rectangular spatially warped truss is reduced, assembly accuracy and speed are greatly improved, and construction materials are saved.

There remains a need for an improved truss-layout system and method with reduced flicker and improved accuracy, as well as for improved systems and methods to project accurate dimensionally calibrated assembly information while avoiding intense and/or flickering laser light that adversely affects human builders and technicians who are participating in the assembly process.

SUMMARY OF THE INVENTION

In some embodiments, the present invention provides a digital projection system (DPS) that uses calibrated light-projection system to project a multi-colored image onto a build surface to guide human builders in the assembly of a truss. In some embodiments, the DPS elicits and receives data from an automated jigging computer and displays a matching, calibrated image to the jigging system. In some embodiments, the DPS elicits and receives digital image data from a camera, wherein the image data are used in calibrating, aligning and warping the projected image. In some embodiments, the DPS elicits and receives data from an operator and displays (e.g., in some embodiments, projects onto an assembly table) a calibrated image for the operator to correctly build the truss.

In some embodiments, the projector cannot be accurately placed above the table to correctly display the truss data, so the image must be modified in order to make the image dimensions match the desired end product as specified by the engineering software. In some such embodiments, the image is warped by the use of algorithms to coordinate (e.g., stitch together) a plurality of images across multiple projectors (e.g., see attached Appendices, which are part of this specification) that are simultaneously projecting their respective output images.

In some embodiments, image data moving off one projector is moved onto another adjacent projector. For example, in some embodiments, an operator moves the work-in-progress pieces of a truss from a first location of the assembly table to a different, second location of the assembly table (e.g., in some embodiments, an operator moves the assembly process to an area of the assembly table that does not have a lifter for moving assembled trusses off the table in order that plates can be attached to the truss more efficiently). In some such embodiments, the projectors shift the projected images so that the images follow the work-in-progress pieces of the truss to the second location on the assembly table (e.g., in some embodiments, as image content is moved out of the field of projection from one or more first projectors, that image content is moved into the field of projection of one or more second projectors).

In some embodiments, the assembly table and/or components mounted to the assembly table along with work-in-progress pieces of the trusses being assembled move along the assembly line while the projectors and the calibration cameras remain at substantially fixed locations, and the projectors shift the projected images based on image analyses of the images captured by the cameras that identify where the various pieces have moved relative to the projector/camera subsystems, so that the images move with the trusses and other parts as the trusses and other parts move, and thus as more and more of the image is moved off of the field of projection from one projector that image content is successively, piece-by-piece, moved into the field of projection of the succeeding projector.

In some embodiments, the input image data from the calibration cameras is analyzed by the method and system of the present invention to check for defects in the parts (e.g., knots in wood beams) and/or incorrect parts being used (the wrong size or shape of truss plates), and as a result of the analysis, audio, visual, and/or other types of warnings are issued by the system and method in order that the human builders can correct the error or rework a truss having such a defect.

In some embodiments, the images displayed are not only calibrated by the image modification described above, but additional graphical and text data (e.g., assembly instructions for the human builders) are also displayed on the work surface to aid in the assembly of the truss. In some embodiments, this additional data includes, but is not limited to, truss-member components, plate size and rotation, heel-to-peek dimensions, truss-name data, truss quantity, and other truss data.

In some embodiments, the present invention provides an active distance finder to adjust the image being displayed on the work surface.

that each obtain input images, and projectors 102 (e.g., 102A-102D) that each project output images, according to some embodiments of the present invention.

Figure 2A:
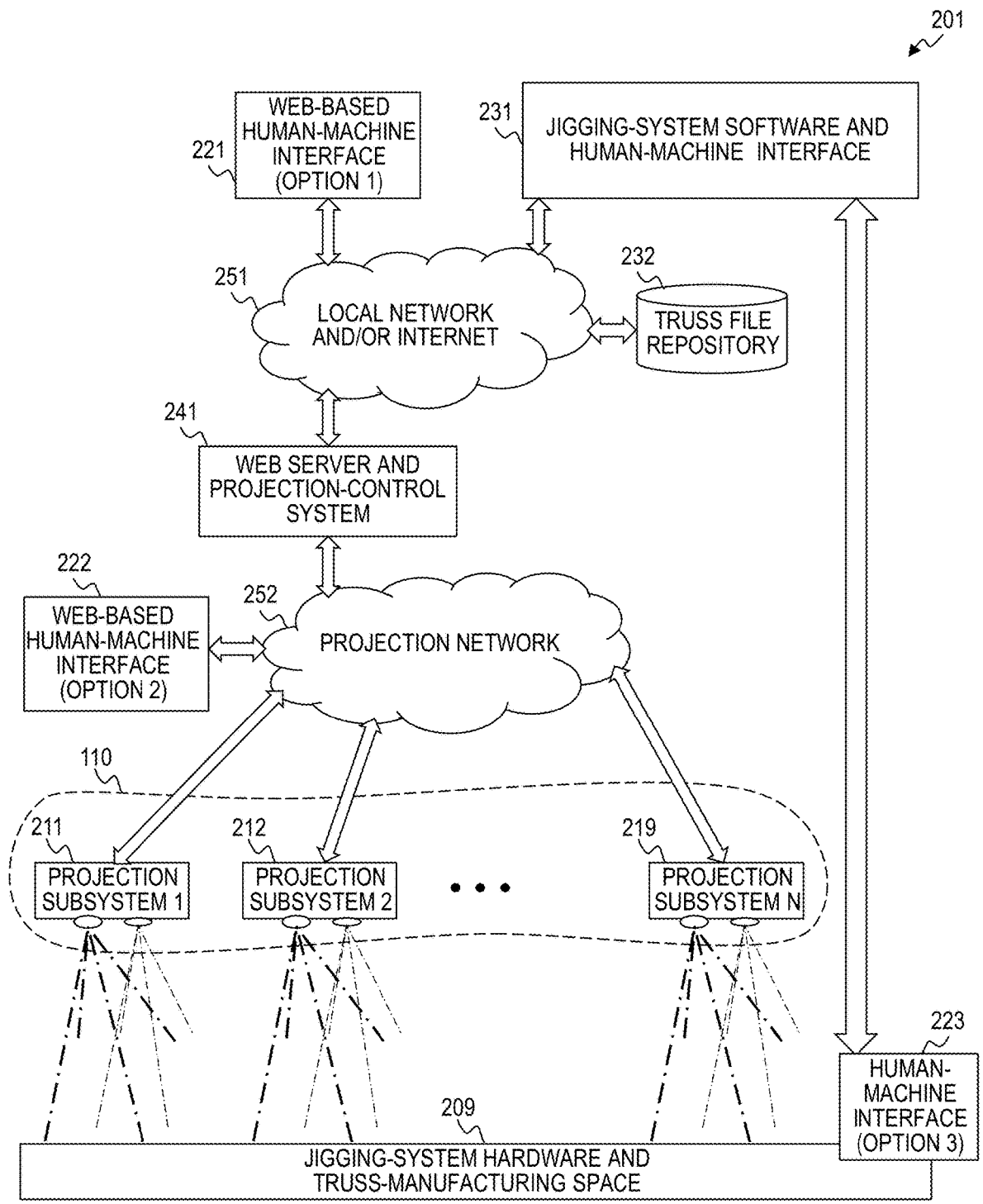

FIG. 2A is a side-view schematic of a system 201 having a plurality 110 of digital projector/camera systems (e.g., 211-219) that each project output images and obtain input images, according to some embodiments of the present invention.

Figure 2B:
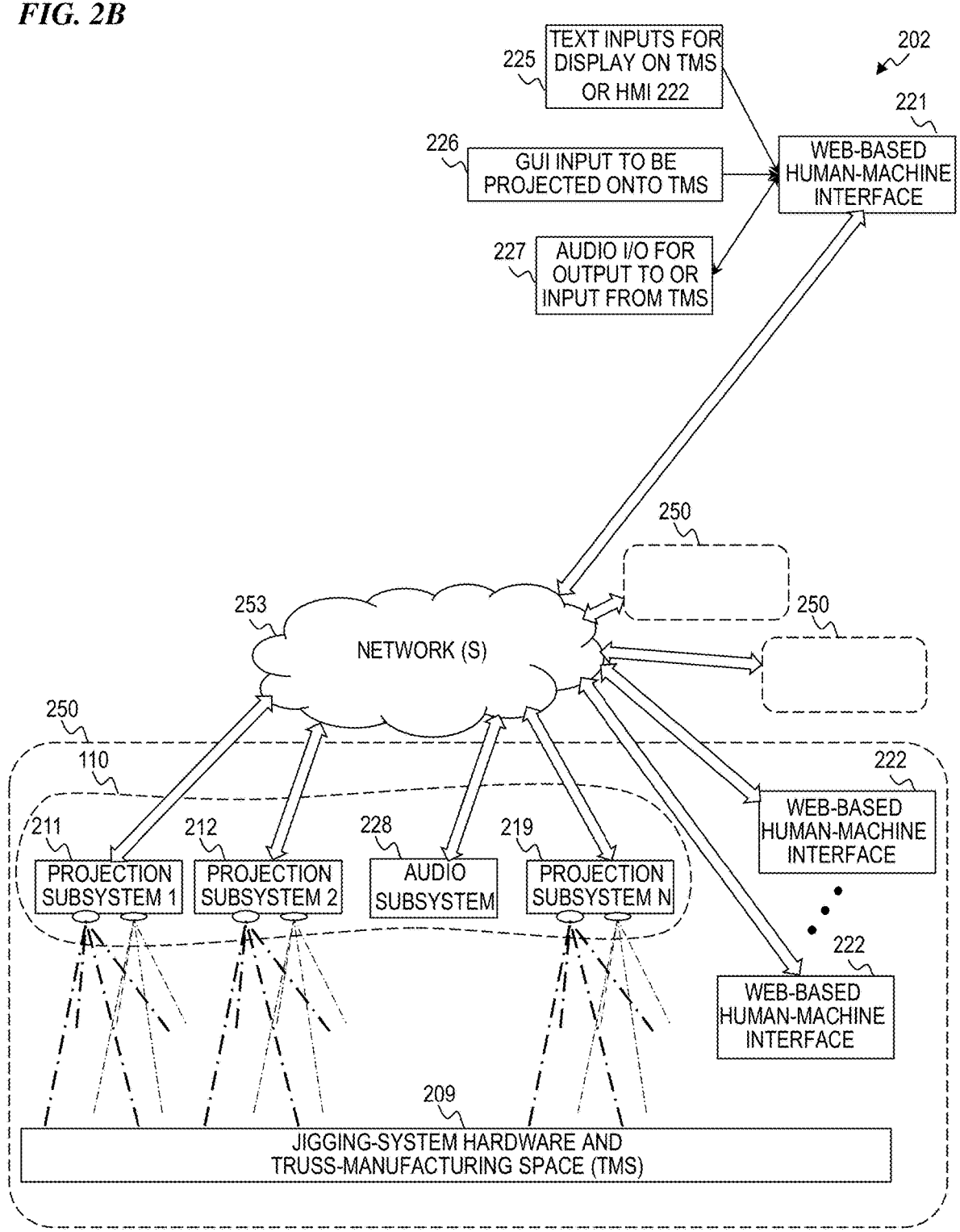

FIG. 2B is a side-view schematic of a system 202 having a plurality of factory systems 250, that each obtain input images for display at a remote human-machine interface (HMI) 221 and that project output images and/or audio based on input from remote HMI 221 back to the factory floors, according to some embodiments of the present invention.

Figure 3A:
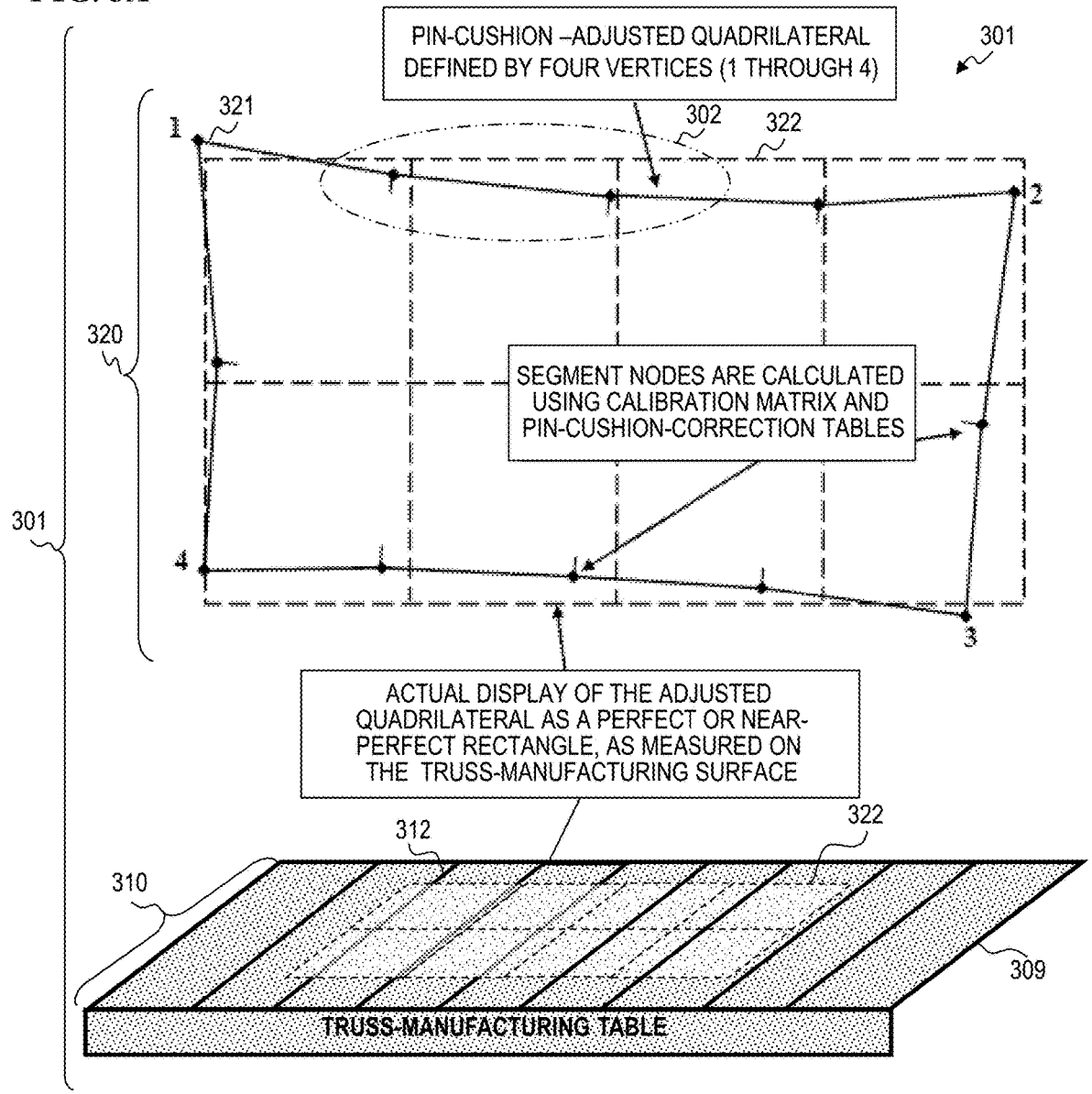

FIG. 3A is a schematic of a system 301 having distortion correction that compensates for projector and table distortions and imperfections, according to some embodiments of the present invention.

Figure 3B:
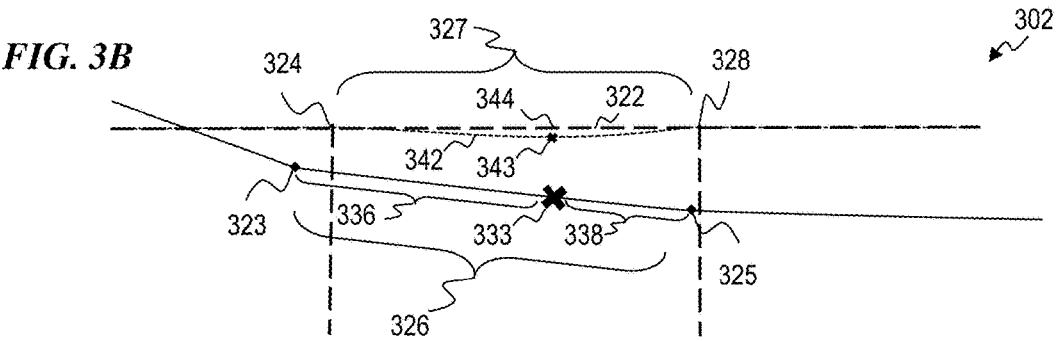

FIG. 3B is a schematic of a close-up portion 302 of system 301 having distortion correction that allows fine-grain adjustment of compensation for projector and table distortions and imperfections, according to some embodiments of the present invention.

Figure 3C:
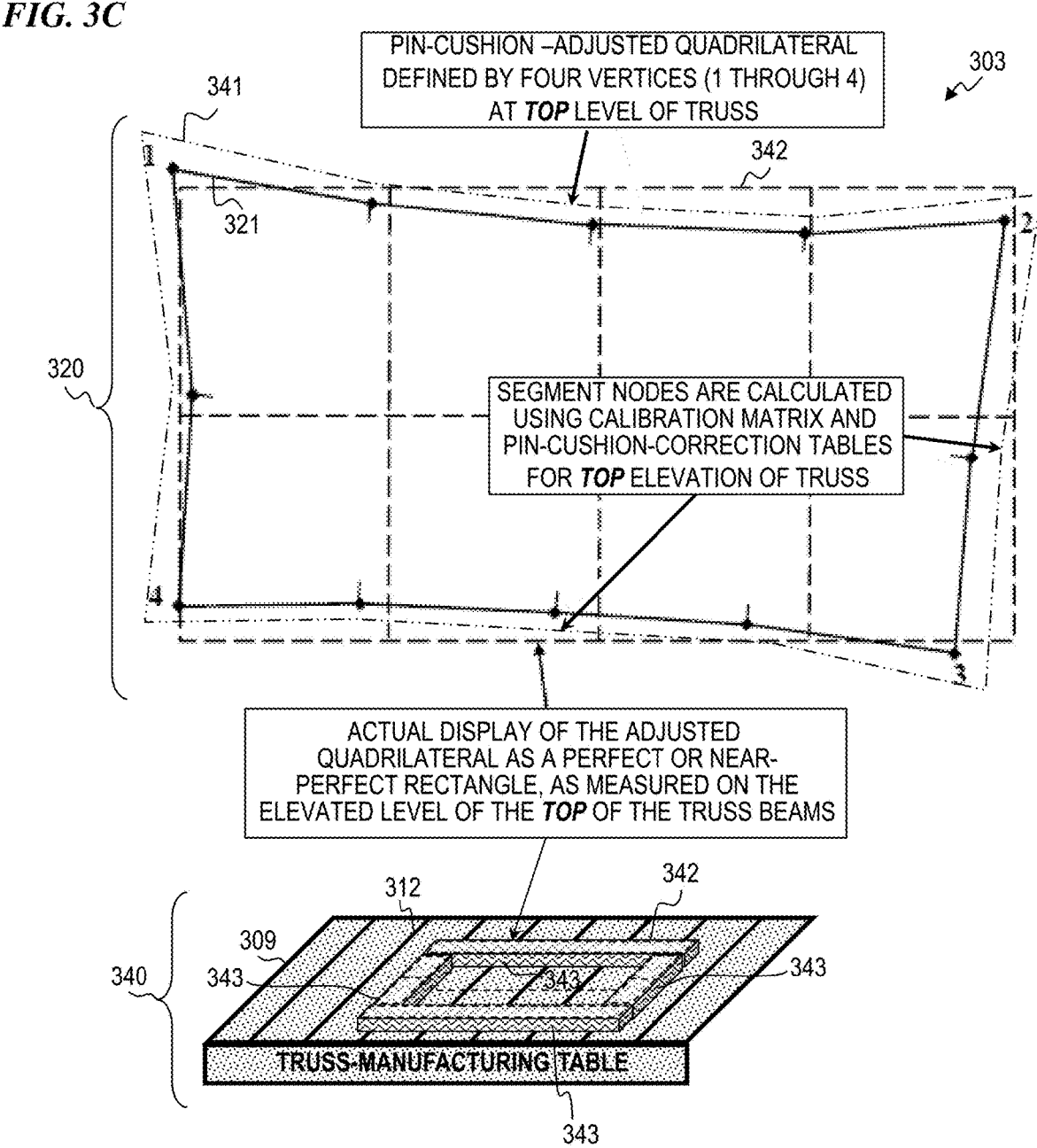

FIG. 3C is a schematic of an operation 303 of system 301 having distortion correction that allows adjustment of the top-level surface of the lumber for compensation of projector and table distortions and imperfections, according to some embodiments of the present invention.

Figure 4:
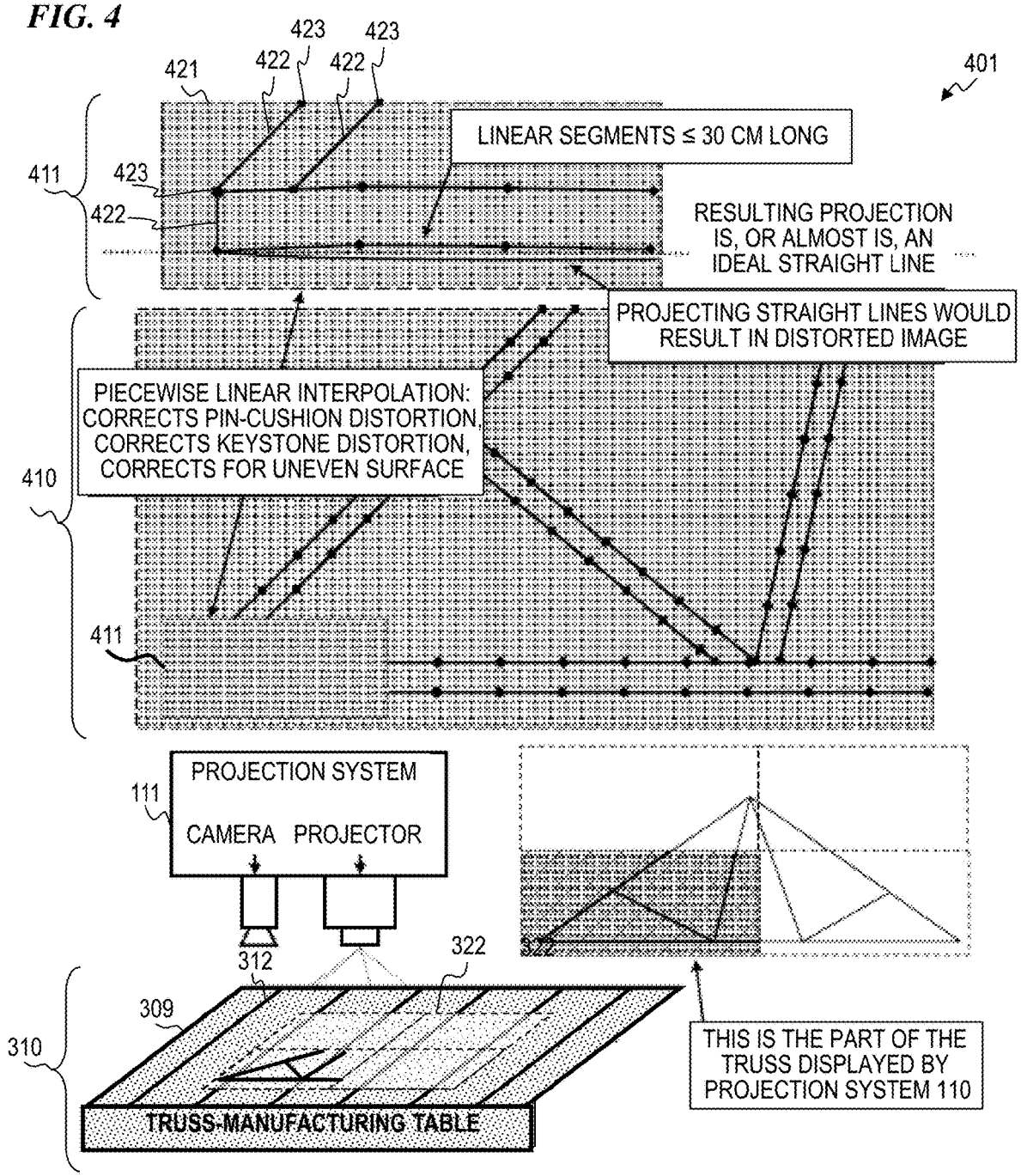

FIG. 4 is a schematic of a system 400 having distortion correction that compensates for projector and table distortions and imperfections, according to some embodiments of the present invention.

Figure 5:
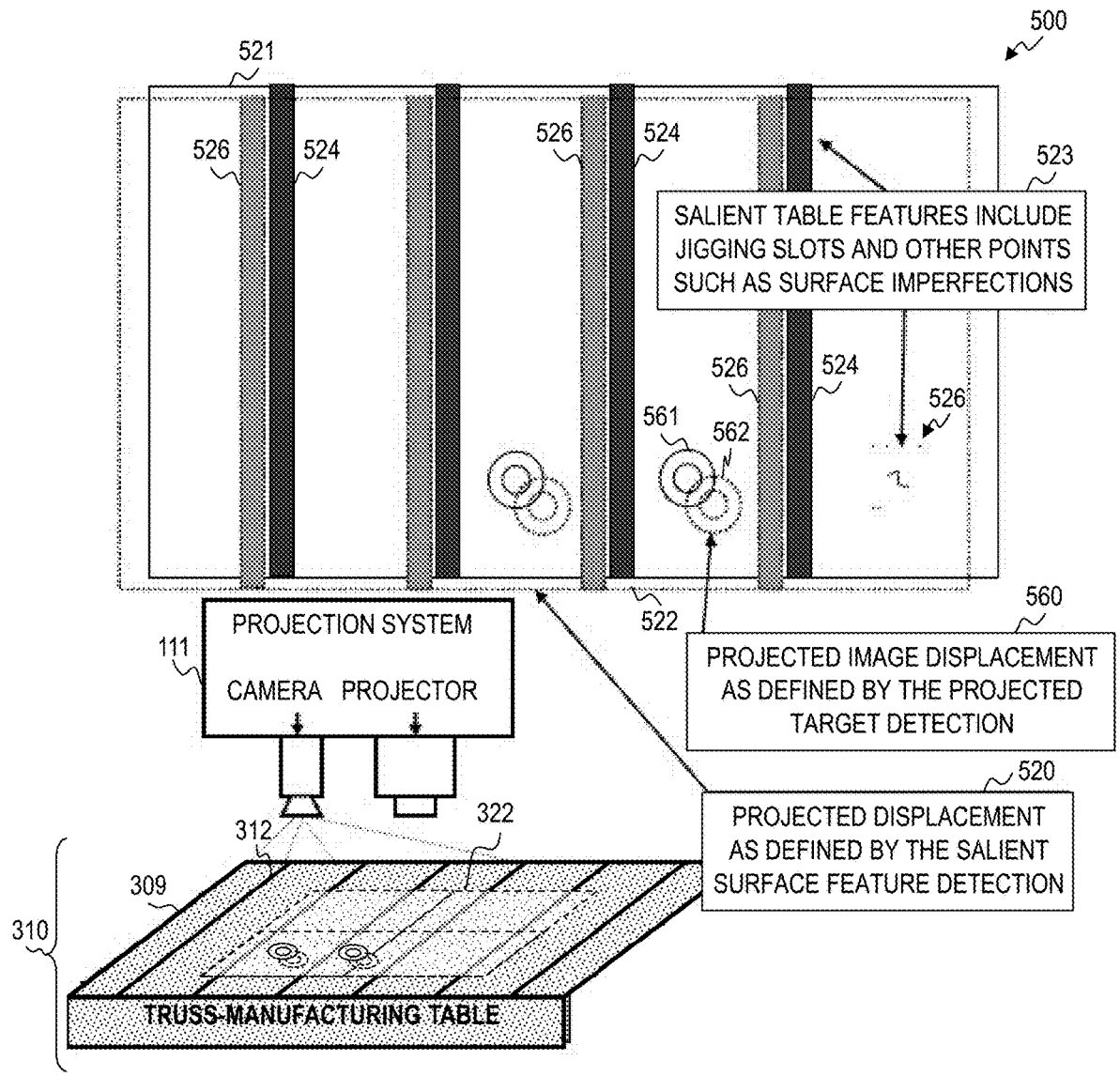

FIG. 5 is a schematic of a system 500 having feature detection that identifies features that can be used to compensate for projector and table distortions and imperfections, according to some embodiments of the present invention.

Figure 6:
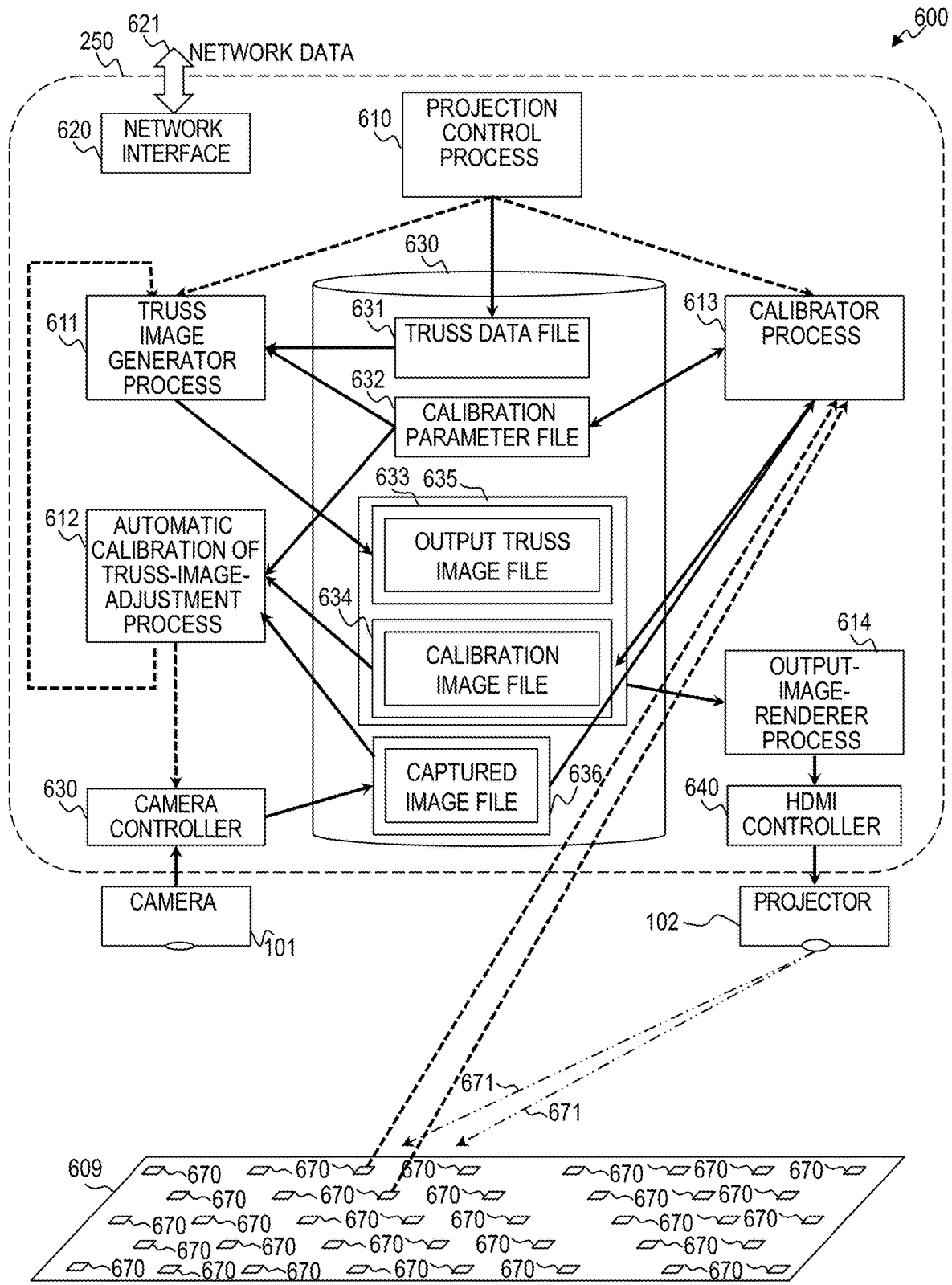

FIG. 6 is a schematic of a software- and hardware-based projection system 600 used by projector-camera subsystems 111, according to some embodiments of the present invention.

Also, see the attached Appendices A-H.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described herein and in the drawings hereto in the attached appendices: Copyright © 2014-2016, Steven R. Weinschenk, All Rights Reserved.

DESCRIPTION OF PREFERRED EMBODIMENTS

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, the present invention provides a digital projection system (DPS) configured to guide builders in the assembly of a workpiece such as a truss. Prior-art laser-projector-based systems such as those described in, for example, U.S. Pat. Nos. 6,170,163, 7,463,368, and 7,621,053 (each of which is incorporated herein by reference) may have undesirable effects on workers who use the systems due to eye strain caused by over-bright laser spots and lines, and flicker as the lasers are scanned around the workplace. In addition, many prior-art laser systems include a limited number (e.g., between three and perhaps as many as 12 to 24) of "witness marks," such as reflective fiducial features (optically discernible features constituting a fixed basis of reference or comparison) or the like, embedded into their truss-assembly table. The limited number of reflective fiducial features makes it difficult to recalibrate such systems to a fine-granularity resolution in a production environment.

In contrast, the present invention, in some embodiments, performs feature extraction from digital images to identify many more "witness points" in three-dimensional space to the software system. In some embodiments, no special or additional fiducial marks need be added to the work surface, but rather the image-processing software used in the present invention automatically identifies features that happen to be part of the work surface and marks/labels/stores these features as witness points. In some embodiments, at least 50, or at least 100, or at least 200, or at least 300, or at least 400, or at least 500, or at least 750, or at least 1000, or at least 2000, or at least 4000 witness points are identified and stored for each work surface. In some embodiments, each of the stored witness points corresponds to a feature inherent in, or optionally features that are marked onto, the work surface, such as table imperfections, grooves, edges, and the like, as well as pen, pencil, chalk or other markings added by a human user. In some embodiments, a human user will lay out geometric layouts (e.g., using a tape measure, a square, a straight-edge, a marking pen, template cutouts, or the like) having known geometry and sizes and the digital cameras of the present invention will obtain images that include both the geometric layout and the features that are inherent in the work surface, such that even after the geometric layouts of known sizes and angles are removed or obscured, the software can interpolate where they were relative to the other features of the work surface, and then use those other features to calibrate where the projected output images should place lines and other features for assisting in truss assembly.

Figure 1:
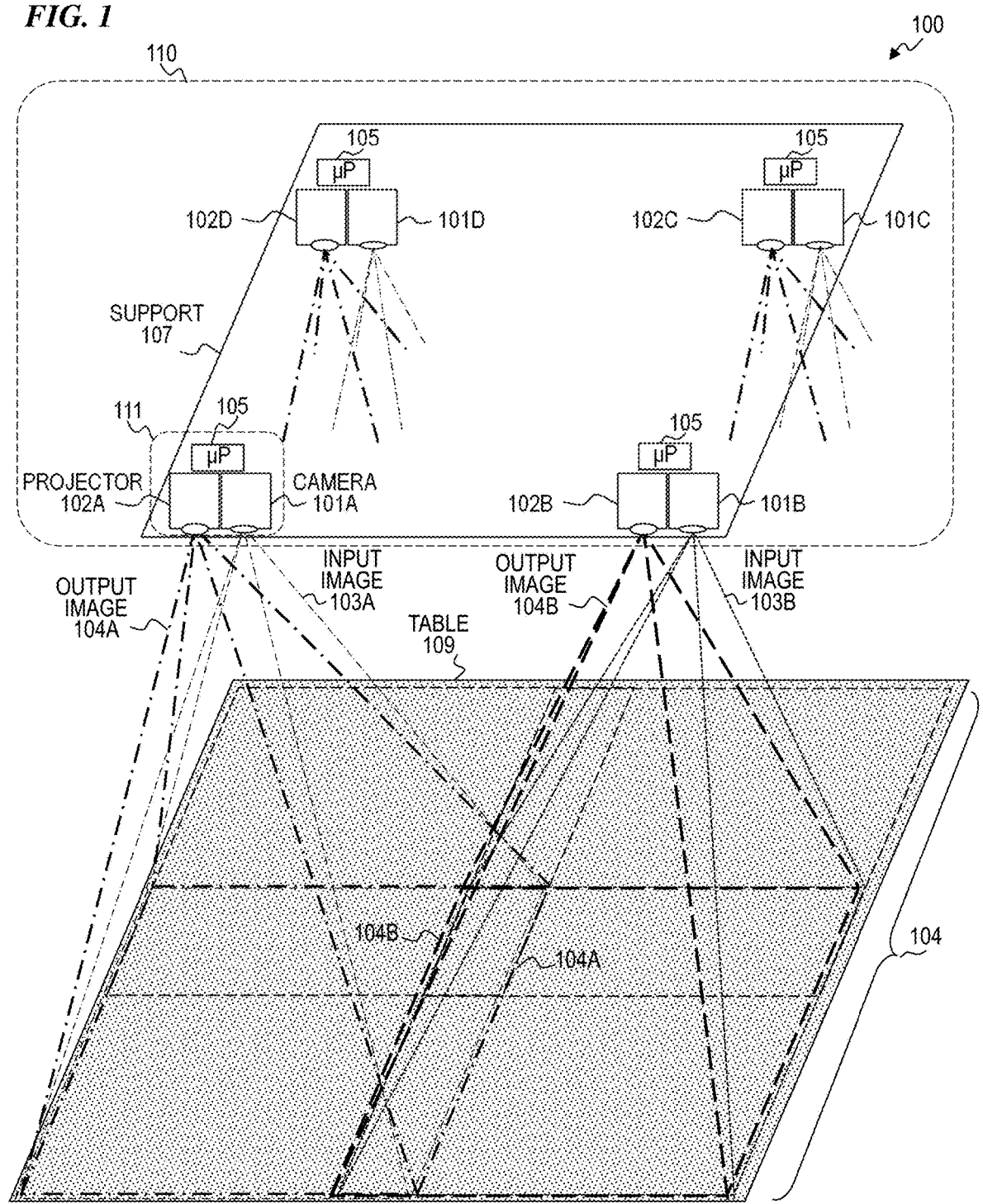
FIG. 1 is a perspective-view schematic of a system 100 having a plurality of digital cameras 101 (e.g., 101A-101D)

FIG. 1 is a perspective-view schematic of a system 100 having a plurality of digital cameras 101 (e.g., 101A-101D) that each obtain input images, and projectors 102 (e.g., 102A-102D) that each project output images, according to some embodiments of the present invention. In some embodiments, a processor system 105 (such as a Raspberry Pi® or the like) is connected to control operation of its respective camera 101 (such as 101A) and its respective projector 102 (such as 102A); and together, each set of an image-processor system 105, camera 101 and projector 102 of a projection subsystem 111, and a plurality of projection subsystems 111 together form a projection system 110 that simultaneously projects a set of slightly overlapping output images 104 (comprising, for example, output image 104A and output image 104B) that slightly overlap one another at their common edge regions as they land on truss-assembly table 109 and on the truss pieces that are being assembled thereon. In some embodiments, the input images 103 (e.g., 103A and 103B) obtained by the cameras 101 have fields of view that slightly overlap one another at their common edges. In some embodiments, the plurality of respective systems 111 are mounted to a support 107 and each perform at least some geometric compensation on the output images 104 based on images acquired during initial and ongoing calibration procedures.

In some embodiments, the plurality of respective image-processor systems 105 additionally or alternatively each have image-analysis software and/or hardware to automatically examine the input images 103 and perform image-analysis calculations (e.g., feature extraction that identifies and locates features such as table imperfections and tool slots on the table 109 that are used for geometric adjustments of the output images 104, and parts-identification and -location to verify that the correct parts are being used and that the parts (such as truss plates and two-by-four beams) are in the correct locations and are substantially defect-free).

FIG. 2A is a side-view schematic of a system 201 having a plurality 110 of digital projector/camera subsystems 111 (e.g., 211-219) that each obtain input images and project output images, according to some embodiments of the present invention. In some embodiments, the plurality of digital projector/camera subsystems 111 are implemented and deployed as parts of a projector/camera system 110 described above for system 100. In some embodiments, jigging-system hardware and truss-manufacturing space 209 includes a table 109 (as described above for FIG. 1) that includes a plurality of slots used for jigging parts (used to hold pieces of the truss being built) and for holding tools (such as truss-plate presses, cutting tools, staplers and the like). In some embodiments, a web server and projection-control system 241 communicates across projection network 252 (e.g., in some embodiments, an Ethernet network; wired or wireless according to the needs of, and parts used in (such as RaspBerry Pi® 3, which includes wireless Bluetooth® and WiFi and wired Ethernet ports), the system 201) to a plurality of subsystems in projector/camera system 110 (including projector/camera subsystems 211, 212, . . . 219, each having its own respective image-processor system 105, camera 101 and projector 102, and each image-processor system 105 projecting its own respective image 104 and capturing a corresponding image 103). In some embodiments, a web-based human-machine interface (HMI) unit 221 elicits and receives input from a human builder and communicates across projection network 252 to HMI unit 222 and/or projector/camera system 110. HMI unit 222 allows the human users (truss builders) to request images and build-instructions, as well as to calibrate the positions and compensate for distortions caused by side-to-side and up-and-down movements of the truss-manufacturing space 209 relative to the projection system 110 that normally occur over time in a factory system. In some embodiments, HMI units 222 and 223 are used in addition to or as alternatives for HMI unit 221. In some embodiments, HMI unit 221 communicates across a local network 251 to projection-control system 241 and/or jigging-system software-hardware 231 (which, in some embodiments, includes HMI software). In some embodiments, jigging-system software-hardware 231 communicates directly or across one of networks 251 and/or 252 to HMI unit 223, which, in some embodiments, forms part of jigging-system hardware and truss-manufacturing space (TMS) 209.

In some embodiments, web server and projection-control system 241 is omitted or reduced in function and much or all of its processing and the method controlling the system as a whole (e.g., systems 100, 201, 202, 301, 303, 401, 500, and 600) is instead or additionally distributed among the digital projector/camera subsystems 111 (i.e., subsystems 211-219) and the HMIs 222.

FIG. 2B is a side-view schematic of a system 202 having one or more factory systems 250, that each obtain input images for display at a remote HMI 221 and that project output images and/or audio based on input from remote HMI 221 back to the factory floors, according to some embodiments of the present invention. In some embodiments, each factory system 250 includes a plurality of digital projector/camera subsystems 111 (e.g., 211-219, together constituting system 110) that each obtain input images for transmission to the remote HMI 221 and project output images and/or audio based on input received from remote HMI 221. In some embodiments, HMI unit 221 is located remotely, at a short or long distance away from systems 250, e.g., in a separate office in the factory or in a separate building, even across the world. Supervisory or management personnel located away from the respective factory floors of systems 250 use HMI 221 to provide a two-directional communications link between the human manager or supervisor at the remote location and the builders on each factory floor. System 202 provides a one- or two-directional interface from which factory-management human users can monitor both product quality (as obtained, communicated and presented by the image-analysis software in each projector/camera subsystem 211-219, as well as allowing human manager personnel to observe the productivity of each of the one or more human builders that operate the truss-manufacturing systems 250. In some embodiments, the input images obtained from the cameras 101 are stored for later retrieval and observation on HMI 221 by human management for quality control (e.g., reviewing to discover what led up to a certain defect in the products produced) and/or determination of worker productivity. In some embodiments, HMI 221 also provides a communication facility by which human supervisors can send text (elicited and received by input device 225), graphical instructions (elicited and received by GUI input device 226), and/or audio feedback (elicited and received by, or output from, audio input/output device 227) from their location at the remote location of HMI 221 to the factory builders who are located at the truss-assembly table 109 (also called the table of truss-manufacturing space (TMS) 209) on the factory floor. In some embodiments, audio subsystem 228 provides the other end for audio input/output device 227, and the two-directional audio between audio subsystem 228 (which outputs audio from the supervisor person and receives input audio to be sent to the supervisor person) and audio input/output device 227 provides a synergistic enhancement to the graphical instructions received by GUI input device 226 (from the human supervisor at the remote location of HMI 221) and then projected onto the work surface of TMS 209. For example, in some embodiments, the human supervisor observes images on a touch-screen web browser display of unit 226 of HMI 221, wherein the images displayed are input image(s) obtained by camera(s) 101 in the projector/camera subsystems 211-219 of projector/camera system 110, and the touch-screen web browser display of unit 226 elicits and receives finger or stylus input from the human supervisor that is then projected to the work surface of TMS 209 as lines, arrows, or other like indicia (essentially, the human supervisor "draws" on the work surface with graphics projected from projectors 102, while receiving immediate feedback as to what was drawn from the images sent back from cameras 101), and that graphical information guides the builders on the factory floor. In some embodiments, textual data received by input device 225 is displayed as text projected from the projectors 102 and/or displayed on HMI 222. In this way, the cameras 101 and projectors 102 provide both the calibration and truss-layout functions described for FIG. 2A, as well as the one- or two-directional communications (graphical, text, and/or audio) between a supervisor at HMI 221 and the truss-building personnel located in the respective factory floor(s) of one or more systems 250.

In some embodiments, each of a plurality of HMIs 222 is used by one of a plurality of respective human users to receive instructions (e.g., from a remote human supervisor at HMI 221) and to interact with and control projection-control system 241 (see FIG. 2A), performing calibration operations on different parts of a TMS 209 or on different TMSs 209 in different systems 250.

In some embodiments, the present invention provides ways for multiple users to each communicate by their respective HMI 222 devices (e.g., in some embodiments, smartphones or tablets) essentially simultaneously (i.e., each inputting data requests and responses in real time) and wirelessly (or using HMI units connected by wires or optical fibers) to the respective parts of system 202. For example, in some embodiments, each one of a plurality of workers can transmit requests or commands via the workers' respective HMI 221, 222 or 223 to projection-control system 241 and/or to other users on their HMI units, and each can perform calibrations on subsections of a single truss-manufacturing space table (TMST) or each on separate TMSTs, while other users are receiving orders or instructions from their HMI units and receiving orders and truss layouts from the images and text projected onto the TMSTs from one or more of the projectors 102. Similarly, human supervisors located at local or remote HMIs 221 can monitor video images received from cameras 101 and production data aggregated from a plurality of HMI units (e.g., 222, 223) and projection-control system(s) 241.

FIG. 3A is a schematic of a system 301 having distortion correction that compensates for projector and table distortions and imperfections, according to some embodiments of the present invention. In some embodiments, each projector/camera subsystem 211-219 (see FIG. 2A) is calibrated by having its projector 102 project a geometric pattern (e.g., a quadrilateral or other suitable shape) and having its camera 101 obtain an image of the work surface of TMS 209. In some embodiments, the human user on the factory floor measures out a geometry and size of a desired FIG. 322 on the work surface of TMS 209 for calibration, the system 301 projects a pre-distorted image 321, wherein image 321 represents the mapping of a desired geometry and size (for example, a rectangle having corners 1, 2, 3 and 4) onto the Cartesian grid of the projector space (e.g., to a high-definition (HD) grid of 1080-by-1920 pixels), and wherein image 321 is divided into a plurality of segments (e.g., segment 326 having end nodes 323 and 325; see FIG. 3B), and the camera 101 obtains an input image that includes data about the measured geometry and size set by the human user as well as the projected image 321 as that image intersects and reflects from the work surface, and processor 105 adjusts the output image from projector 102 until it matches the measured geometry and size set by the human user. In some embodiments, the human user points (e.g., using a finger or stylus) to each successive one of the projected points or corners (e.g., corners 1, 2, 3 and 4 of FIG. 3A), and "moves" or "drags" that point or corner (like dragging a mouse cursor on a computer screen, but in this case, the image processing of the input images obtained from cameras 101 identifies the gestures (such as pointing with a user's finger or a specially shaped pointer that may be easier to identify from the digital images)) to the proper location on the measured geometry and size. In some embodiments, the human user also successively points to each endpoint node of each segment (e.g., endpoint nodes 323 and 325 of segment 326; FIG. 3B) and "drags" that endpoint node to its desired endpoint (e.g., endpoint location 324 for endpoint node 323 and endpoint location 328 for endpoint node 325), such that the segment 326 as projected onto the work surface lies directly on the measured geometry and size segment 327 set by the human user. In some embodiments, if the resulting projected image is adjusted in error, the user can indicate by another gesture (such as shaking their hand back and forth across the table to "erase" a misinterpreted adjustment gesture) to "undo" an error in the calibration image and correction factors. Thus the system (by projecting an image (essentially, eliciting input from the user into the computer system) and then capturing input images and the user's gestures over the truss-assembly table (essentially, receiving input into the computer system from the user at many different locations on the table), and as a result of the received user input, adjusting the projected image) is accumulating adjustment factors into a calibration parameter file (e.g., see unit 632 of FIG. 6) that are later applied when projecting a calibrated truss image that is interpreted by the human truss builder as instructions for what she or he is supposed to do. Because the calibration process accumulates position and distortion information from dozens or hundreds of points across the entire area, the system can later obtain captured input images (of the truss-assembly table and the parts thereon) that are missing many of the calibration points, and the system is able to perform the distortion corrections on the less-than-complete data (e.g., in some embodiments, by performing artificial-intelligence (AI) or "vote-type" calculations to determine the most likely positions of the missing data points using the data points that are identified in the captured image).

In other embodiments, rather than eliciting and receiving input directly on the truss-assembly table, the system elicits and receives input on a separate device (such as a smartphone or iPad® screen used as HMI 222), and the human user can input a particular direction and distance on HMI 222 that the projected pattern for one of the locations needs to be adjusted in order that the projected pattern exactly (to some desired accuracy) matches the measured geometry and size. The camera 101 then obtains an image that includes the projected calibration pattern superimposed on the many inherent features (e.g., in some embodiments, dozens or hundreds of witness points each are correlated to respective ones of the identified features) of the work surface of TMS 209. Thereafter, later images are each analyzed by the feature-extraction software in each processor 105 to identify a large number of the witness points, and only a subset of the entire set of witness points is needed to compensate for distortions of the work surface of TMS 209 or the movement of the work surface of TMS 209 relative to projection system 110. In some embodiments, the desired pattern (size and geometry) for a given truss is obtained from a database stored in truss-file repository 232 (see FIG. 2A), and each processor 105 "warps" its respective portion of the image to be projected, along with outputting instructions for the human truss-builder person (e.g., which jigging parts to use and where they are to be placed, which lumber to use, which truss plates to use, how many temporary staples to use, the amount of hydraulic pressure to apply to the truss plate, and the like information in graphical, audio and/or textual form). Thus, in FIG. 3A, reference number 310 refers to table 309 of the TMS 209 of FIG. 2A (or table 109 of FIG. 1), along with jigging slots 312 and projected light pattern 322. In some embodiments, during the calibration process a "perfect" rectangle (to a desired accuracy) is achieved by "moving" the vertices of the image and adjusting pin-cushion distortion (image magnification increases with the distance from the optical axis, thus narrowing in the middle of the horizontal and vertical directions), barrel distortion (widening in the middle of the horizontal and vertical directions), keystone distortion (widening at one edge and narrowing along the opposite edge, such as may be due to projecting an image onto a surface at an angle), and other optical distortion correction parameters. In some embodiments, this is verified by a tape measure and a string. In some embodiments, across an entire area of one projector 102 and its camera 101, a grid of rectangles is defined. For each rectangle of the grid, a projection matrix is calculated from the displacement of each of the four vertices (e.g., 323 of FIG. 3B) from their "ideal rectangle" positions (e.g., 324 of FIG. 3B), along with pin-cushion adjustments based on a quadratic radial de-centering adjustment. These calibration parameters will then be used to calculate the segment node coordinates for the piecewise linear interpolation of the image elements. Portion 302 of system 301 is shown in close-up in FIG. 3B.

In some embodiments of each of the systems described herein, one or more of the devices (such as HMI 222) are wirelessly communicatively coupled (e.g., using WiFi, Bluetooth®, infrared signals and/or other suitable wireless technologies) to one or more others of the devices (such as control system 241 or one of the projector/camera systems 111), while in other embodiments, most or all of the devices are communicatively coupled using physical wires, or, in still other embodiments, using optical-fiber cables.

FIG. 3B is a schematic of a close-up portion 302 of system 301 having distortion correction that allows fine-grain adjustment of compensation for projector and table distortions and imperfections, according to some embodiments of the present invention. Occasionally, the initial segment length may not be short enough for proper correction of certain portions of the projected image (since segment length corresponds to the granularity of distortion correction). For example, the line 342 (having short dashes in FIG. 3B) may not be close enough to the desired measured line 344 (the straight line having long dashes in FIG. 3B). In some embodiments, the user in such a case can interactively create a new additional node 333 by pointing (using a finger gesture or stylus) to the distorted line 342, and the projected image will show a new node 343 (for example, having a small X symbol or the like). Then the user can drag that new node point onto line 344 (the measured line made by the human user), and the system 301 (having elicited the input by waiting for the user gesture, and displayed the X for the new node 333, and having received the video image and tracking the gesture), then responds by tracking the X-shaped icon 343 (or any other suitable icon or indicator) as it is dragged by the user onto measured-out line 344. Segment 326 has thus been divided into two segments, 336 and 338, by introduction of new node 333.

FIG. 3C is a schematic of an operation 303 of system 301 having distortion correction that allows adjustment of the top-level surface of the lumber for compensation of projector and table distortions and imperfections, according to some embodiments of the present invention.

FIG. 4 is a schematic of a system 401 having distortion correction that compensates for projector and table distortions and imperfections, according to some embodiments of the present invention. In some embodiments, each of a plurality of projector/camera systems (e.g., 211-219 of FIG. 2A) is connected with the projection-control system (e.g., 241 of FIG. 2A) to display all or a part of the truss. In some embodiments, the projection method employed by projector/camera systems 221-229 and projection-control system 241 (see FIG. 2A) uses calibration parameters that adjust for keystone (widening at one edge and narrowing along the opposite edge, such as may be due to projecting an image onto a surface at an angle) and torsion (projection) distortion and pin-cushion distortion. Each of several projector/camera systems connected with the projection control system 241 displays a part of the truss to be built. In some embodiments, the calibration parameters are used to calculate the segment nodes for each one of a plurality of segments by piecewise linear interpolation, in order to generate the resulting image lines. In some embodiments, the piecewise linear interpolation corrects pin-cushion distortion, corrects keystone distortion, and corrects for uneven surface of the work surface of TMS 209. In some embodiments, each segment 422 has two end nodes 423 and is less than about 1 foot (no more than about 30 cm) long. In some embodiments, each segment 422 is no more than about 50 cm long. In some embodiments, each segment 422 is no more than about 40 cm long. In some embodiments, each segment 422 is no more than about 20 cm long. In some embodiments, each segment 422 is no more than about 10 cm long. In some embodiments, each segment 422 is no more than about 5 cm long.

In some embodiments of the present invention, a plurality of different colors of light is projected as a single image, wherein each color represents a different feature. For example, in some embodiments, green-colored lines are projected to indicate the bottom edge, i.e., the edge at table-surface level of each lumber piece, while white-colored lines are projected to indicate the top edge, i.e., the edge at 1.5 inches (or 5 cm) above table-surface level of each lumber piece. In some embodiments, other different colors are used. In some embodiments, different line types (e.g., solid lines, broken lines (such as dashed lines, single dots or pluralities of dots, dot-dashed lines and the like), thicker versus thinner lines, solid-filled shapes versus outlined shapes, unblinking lines/shapes versus blinking lines/shapes) are used for these (i.e., height-off-the-table parallax and distortion corrections) and other aspects of the projected image. Thus, unlike systems that use only lines of a single color (such as laser-based line-scanning systems), with the present invention projecting simultaneously in a plurality of different colors and/or line types, the human operator can readily tell by line color or line type whether a particular line of the projected light image represents the top or bottom surface of the lumber at each location. In some embodiments, high-resolution images (e.g., 1080-by-1920-pixel high-definition (HD) images, or even 2160-by-3840-pixel "4K-resolution" images) are projected to provide fine-grained resolution and accuracy. Further, in some embodiments, the present invention's projectors provide text information as to the parts and/or tools to be used in the assembly process, as well as providing feedback and instructions from supervisors located at remote HMI devices such as HMI 221 of FIG. 2B, set forth above.

FIG. 5 is a schematic of a system 500 having automatic calibration adjustment including feature detection that identifies features that can be used to compensate for projector and table distortions and imperfections, according to some embodiments of the present invention. In some embodiments, the automatic calibration adjustment, to adjust for deviations of the projected image in relation to the truss manufacturing surface TMS 209 (a rigid metal structure), at the time of calibration, and subsequently at regular time intervals (or as requested), obtains from each projector/camera system 111 a first image of the table surface (including table edge 521, slots 524, jigging pucks 561, and random or purposely made marks 526), and a second image of the table with projected special targets (fiducial indicators of the image) on the surface (the second image being of the same table area as the first image, but with the addition of the projected targets). In some embodiments, using a machine-vision algorithm for salient table-feature detection, a displacement of the projector/camera system 111 in relation to the table is calculated. (In some embodiments, process 520 calculates displacement relative to salient surface features by imaging the salient surface features such as 526 without the projected image and then projecting a calibration image (which, in some embodiments, includes projected markings), and then imaging the table again to measure the distance between the projected markings and the salient surface features 526; and process 560 calculates displacement between two features (e.g., 562) in the projected image and features (e.g., jigging puck 561) of the table and things on the table.) Then, using the target-detection algorithm, an absolute displacement of each portion or segment in the projected image (including, e.g., a projected image of the projected table edge 522, projected slots 526, projected jigging pucks 562) in relation to each of the table surface features is obtained. Using this displacement map (i.e., the amount and direction of displacement for each area subdivision of the projected image), a new calibration matrix is calculated and the truss image is recreated and projected.

FIG. 6 is a schematic of a software- and hardware-based projection system 600 used by projector/camera subsystems 111, according to some embodiments of the present invention. In FIG. 6 dotted arrows represent control flow and solid arrows represent data flow. In some embodiments, the output image file 635 contains an output truss image 633 created by truss image generator process 611 (during normal operation), or calibration grid 634 created by calibrator process 613 (during calibration procedure). In some embodiments, an automatic calibration of truss-image-adjustment process 612 uses the calibration parameters obtained from calibration parameter file 632 and/or an image 636 or the analysis results obtained from a captured image 636 to adjust the locations of endpoints of each segment of the truss lines being generated by truss-image-generator process 611. In some embodiments, a first embodiment of the calibration process 613 uses the input image 636 of the TMS table 209 and performs an image-analysis process to identify features in that input image that are used for the calibration, monitoring and feedback.

In some embodiments, a different second embodiment of calibration process 613 is used as a substitute for or as an addition to the first embodiment of the calibration process 613 in which the input images 636 from the cameras 101 are used to obtain images of the table 109 of TMS 209, wherein the images are analyzed and used for calibration, monitoring and feedback. In some embodiments, the second embodiment of calibration process 613 uses light sensors 670 that are embedded in the table 609 at a plurality of spaced-apart locations, and each light sensor 670 communicates signals to calibration process 613. In some such embodiments, the projected calibration image 634 (e.g., having an array of pixels that can each be illuminated or turned off, for example an HD image of 1024 by 1920 pixels) is controlled to move each respective calibration point 671 of the projected image (pixel-to-pixel) until the exact pixel that should correspond to a particular respective sensor 670 has activated that sensor 670, and the signal from the particular sensor to calibration process 613 indicates that that exact pixel does correspond to the particular respective sensor 670.

In some embodiments of the first embodiment of the calibration process 613, reflectors are substituted for the sensors at each location on table 609 or 109 (the locations that would be used for sensors 670 in the second embodiment), and the camera 101 captures images that indicate when a particular pixel of projected light is detected to have been reflected by a particular reflector at the particular location 670.

In some embodiments, the present invention provides an apparatus for assembling components of a workpiece. This apparatus includes: a work surface that receives components of the workpiece; and a first projector/camera subsystem that includes: a first digital projector that projects a first output digital image of at least some features of the workpiece onto the work surface, wherein the first output digital image includes a plurality of line indicators that have visually discernible different markings, wherein the plurality of line indicators of the first output digital image include a first line indicator that has a first marking and a second line indicator that has a second marking; a first digital camera that obtains input images of the work surface and the components of the workpiece; and a first controller configured to receive the input images from the first digital camera and to control the first digital projector to project the first output digital image on the work surface for assembly of the components to form the workpiece, wherein the first controller is further configured to store distortion-correction parameters and to use the stored distortion-correction parameters to adjust the first projected output digital image.

In some embodiments of the apparatus, the first marking is a first color and the second marking is a second color, and wherein those of the plurality of line indicators that have the first color indicate a first elevation relative to the work surface and those of the plurality of line indicators that have the second color indicate a second elevation relative to the work surface.

In some embodiments of the apparatus, the first marking is a solid line and the second marking is a dashed line, and wherein those of the plurality of line indicators that have the solid line indicate a first elevation relative to the work surface and those of the plurality of line indicators that have the dashed line indicate a second elevation relative to the work surface.

In some embodiments of the apparatus, first controller of the first projection subsystem is further configured to transmit a plurality of the received images from the first digital camera to a remote human-machine interface (HMI) unit.

In some embodiments of the apparatus, first controller of the first projector/camera subsystem is further configured to transmit a plurality of the received images to a remote human-machine interface (HMI) unit, and wherein the first controller is further configured to receive interactively human-generated graphical information from the remote human-machine interface (HMI) unit and to interactively project the human-generated graphical information onto the work surface as the workpiece is being assembled such that further input images obtained by the first digital camera include the human-generated graphical information from the remote HMI unit.

In some embodiments of the apparatus, the first projector/camera subsystem further includes: a second digital projector that projects a second output digital image of at least some features of the workpiece onto the work surface, wherein the second output digital image includes a plurality of line indicators that have visually discernible different markings including a first line indicator that has a first marking and a second line indicator that has a second marking; a second digital camera that obtains input images of the work surface and the components of the workpiece; and a second controller configured to receive the input images from the second digital camera and to control the second digital projector to project the second output digital image on the work surface stitched together with the first output digital image such that at least a portion of the first line indicator of the first output digital image overlaps at least a portion of the first line indicator of the second output digital image for assembly of the components to form the workpiece.

In some embodiments of the apparatus, the first projector/camera subsystem further includes: a second digital projector that projects a second output digital image of at least some features of the workpiece onto the work surface, wherein the second output digital image includes a plurality of line indicators that have visually discernible different markings, wherein plurality of line indicators of the second output digital image include a first line indicator that has a first marking and a second line indicator that has a second marking; a second digital camera that obtains input images of the work surface and the components of the workpiece; and a second controller configured to receive the input images from the second digital camera and to control the second digital projector to project the second output digital image on the work surface stitched together with the first output digital image such that at least a portion of the first line indicator of the first output digital image overlaps at least a portion of the first line indicator of the second output digital image for assembly of the components to form the workpiece. In these embodiments, the apparatus further includes a second projector/camera subsystem that has substantially identical parts as the first projector/camera subsystem, and wherein the first projector/camera subsystem and the second projector/camera subsystem are both operatively coupled to a remote human-machine interface (HMI) unit, and wherein the first controllers of both the first projector/camera subsystem and the second projector/camera subsystem are further configured to receive interactively human-generated graphical information from the remote human-machine interface (HMI) unit and to interactively project the human-generated graphical information onto the work surface as the workpiece is being assembled such that further input images obtained by the first digital camera include the human-generated graphical information from the remote HMI unit.

In some embodiments, the present invention provides a method for assembling components of a workpiece. This method includes: receiving components of the workpiece on a work surface; projecting a first output digital image of at least some features of the workpiece onto the work surface, wherein the first output digital image includes a plurality of line indicators that have visually discernible different markings including a first line indicator that has a first marking and a second line indicator that has a second marking; obtaining a first set of input digital images of the work surface and the components of the workpiece; receiving the first set of input images; and controlling the projecting of the first output digital image onto the work surface for assembly of the components to form the workpiece, and storing distortion-correction parameters and using the stored distortion-correction parameters to adjust the projecting of the first output digital image.

In some embodiments of the method, the first marking is a first color and the second marking is a second color, and wherein those of the plurality of line indicators that have the first color indicate a first elevation relative to the work surface and those of the plurality of line indicators that have the second color indicate a second elevation relative to the work surface.

In some embodiments of the method, the first marking is a solid line and the second marking is a dashed line, and wherein those of the plurality of line indicators that have the solid line indicate a first elevation relative to the work surface and those of the plurality of line indicators that have the dashed line indicate a second elevation relative to the work surface.

Some embodiments of the method further include transmitting a plurality of the received images to a remote human-machine interface (HMI) unit.

Some embodiments of the method further include transmitting a plurality of the received images to a remote human-machine interface (HMI) unit; receiving interactively human-generated graphical information from the remote human-machine interface (HMI) unit; and interactively projecting the human-generated graphical information onto the work surface as the workpiece is being assembled such that further input images obtained include the projected human-generated graphical information from the remote HMI unit.

Some embodiments of the method further include projecting a second output digital image of at least some features of the workpiece onto the work surface, wherein the second output digital image includes a plurality of line indicators that have visually discernible different markings including a first line indicator that has a first marking and a second line indicator that has a second marking; obtaining a second set of input images of the work surface and the components of the workpiece; receiving the second set of input images; and controlling the projecting of the second output digital image onto the work surface stitched together with the first output digital image such that at least a portion of the first line indicator of the first output digital image overlaps at least a portion of the first line indicator of the second output digital image for assembly of the components to form the workpiece.

Some embodiments of the method further include projecting a second output digital image of at least some features of the workpiece onto the work surface, wherein the second output digital image includes a plurality of line indicators that have visually discernible different markings including a first line indicator that has a first marking and a second line indicator that has a second marking; obtaining a second set of input images of the work surface and the components of the workpiece; and receiving the second set of input images and to control the second digital projector to project the second output digital image on the work surface stitched together with the first output digital image such that at least a portion of the first line indicator of the first output digital image overlaps at least a portion of the first line indicator of the second output digital image for assembly of the components to form the workpiece; providing a first projection subsystem that performs the method; providing a second projection subsystem performs a method substantially identical as the first projection subsystem; and operatively coupling both the first projection subsystem and the second projection subsystem to a remote human-machine interface (HMI) unit, and wherein both the first projection subsystem and the second projection subsystem are further configured to receive interactively human-generated graphical information from the remote human-machine interface (HMI) unit and to interactively project the human-generated graphical information onto the work surface as the workpiece is being assembled such that further input images obtained by the first digital camera include the human-generated graphical information from the remote HMI unit.

In some embodiments, the present invention provides a computer-readable storage device that includes computer-executable instructions that when executed, perform a method including: projecting a first output digital image of at least some features of a workpiece onto a work surface, wherein the workpiece includes a plurality of pieces, and wherein the first output digital image includes a plurality of line indicators that have visually discernible different markings including a first line indicator that has a first marking and a second line indicator that has a second marking; obtaining a first set of input digital images of the work surface and the components of the workpiece; receiving the first set of input images; and controlling the projecting of the first output digital image onto the work surface for assembly of the components to form the workpiece, and storing distortion-correction parameters and using the stored distortion-correction parameters to adjust the projecting of the first output digital image.

In some embodiments, the present invention provides one or more computer-readable storage media that include instructions that, when executed by a computer system, cause the computer system to perform a method that includes: projecting a first output digital image of at least some features of a workpiece onto a work surface, wherein the workpiece includes a plurality of pieces, and wherein the first output digital image includes a plurality of line indicators that have visually discernible different markings including a first line indicator that has a first marking and a second line indicator that has a second marking; obtaining a first set of input digital images of the work surface and the components of the workpiece; receiving the first set of input images; and controlling the projecting of the first output digital image onto the work surface for assembly of the components to form the workpiece, and storing distortion-correction parameters and using the stored distortion-correction parameters to adjust the projecting of the first output digital image.

In some embodiments of the one or more computer-readable storage media, the first marking is a first color and the second marking is a second color, and wherein those of the plurality of line indicators that have the first color indicate a first elevation relative to the work surface and those of the plurality of line indicators that have the second color indicate a second elevation relative to the work surface.

In some embodiments of the one or more computer-readable storage media, the first marking is a solid line and the second marking is a dashed line, and wherein those of the plurality of line indicators that have the solid line indicate a first elevation relative to the work surface and those of the plurality of line indicators that have the dashed line indicate a second elevation relative to the work surface.

Some embodiments of the one or more computer-readable storage media further include instructions such that the method further includes transmitting a plurality of the received images to a remote human-machine interface (HMI) unit.

Some embodiments of the one or more computer-readable storage media further include instructions such that the method further includes: transmitting a plurality of the received images to a remote human-machine interface (HMI) unit; receiving interactively human-generated graphical information from the remote human-machine interface (HMI) unit; and interactively projecting the human-generated graphical information onto the work surface as the workpiece is being assembled such that further input images obtained include the projected human-generated graphical information from the remote HMI unit.

Some embodiments of the one or more computer-readable storage media further include instructions such that the method further includes: projecting a second output digital image of at least some features of the workpiece onto the work surface, wherein the second output digital image includes a plurality of line indicators that have visually discernible different markings including a first line indicator that has a first marking and a second line indicator that has a second marking; obtaining a second set of input images of the work surface and the components of the workpiece; receiving the second set of input images; and controlling the projecting of the second output digital image onto the work surface stitched together with the first output digital image such that at least a portion of the first line indicator of the first output digital image overlaps at least a portion of the first line indicator of the second output digital image for assembly of the components to form the workpiece.

Some embodiments of the one or more computer-readable storage media further include instructions such that the method further includes: projecting a second output digital image of at least some features of the workpiece onto the work surface, wherein the second output digital image includes a plurality of line indicators that have visually discernible different markings including a first line indicator that has a first marking and a second line indicator that has a second marking; obtaining a second set of input images of the work surface and the components of the workpiece; receiving the second set of input images and to control the second digital projector to project the second output digital image on the work surface stitched together with the first output digital image such that at least a portion of the first line indicator of the first output digital image overlaps at least a portion of the first line indicator of the second output digital image for assembly of the components to form the workpiece, and executing the method on a first projection subsystem that performs the method; and on a second projection subsystem performs a method substantially identical as the first projection subsystem, and operatively coupling both the first projection subsystem and the second projection subsystem to a remote human-machine interface (HMI) unit, and wherein both the first projection subsystem and the second projection subsystem are further configured to receive interactively human-generated graphical information from the remote human-machine interface (HMI) unit and to interactively project the human-generated graphical information onto the work surface as the workpiece is being assembled such that further input images obtained by the first digital camera include the human-generated graphical information from the remote HMI unit.

See the attached appendices for exemplary code according to some embodiments of the present invention. In some embodiments, computational functionality is moved from projector/camera control system 241 into projector/camera subsystems 211-219 (de-centralizing the execution such that the processors 105 in each of the multiple projector/camera subsystems 211-219 take on more of the processing of input images and the distortion-compensation processing of the output images such that this processing is performed in parallel by a greater number of processors) while in other embodiments, the projector/camera control system 241 performs more of the image processing and passes the resulting pre-processed images to the projector/camera subsystems 211-219. It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein. Still further, it is specifically contemplated that the present invention includes embodiments having combinations and subcombinations of the various embodiments described herein and the various embodiments described by the patents and related applications incorporated by reference above.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus for displaying a plurality of components of a workpiece on a work surface, the apparatus comprising:
    a first projector/camera subsystem that includes:
        a first digital projector that projects a first output digital image of at least some features of the plurality of components of the workpiece onto the work surface, wherein the first output digital image includes a plurality of line-indicator markings;
        a first digital camera that obtains input images of the work surface and the components of the workpiece;
        a first controller configured to receive the input images from the first digital camera and to control the first digital projector to project the first output digital image on the work surface for assembly of the components to form the workpiece;
        a second digital projector that projects a second output digital image of at least some features of the plurality of components of the workpiece onto the work surface;
        a second digital camera that obtains input images of the work surface and the plurality of components of the workpiece; and
        a second controller configured to control the second digital projector to project the second output digital image on the work surface stitched together with the first output digital image such that at least a portion of the first line indicator of the first output digital image overlaps at least a portion of the first line indicator of the second output digital image, wherein the first and second controllers each perform at least some geometric compensation on the output images based on images acquired during initial and ongoing calibration procedures.

2. The apparatus of claim 1, wherein a first line-indicator marking is a first color and a second line-indicator marking is a second color, and wherein those of the plurality of line indicators that have the first color indicate a first elevation relative to the work surface and those of the plurality of line indicators that have the second color indicate a second elevation relative to the work surface.

3. The apparatus of claim 1, wherein a first line-indicator marking is a solid line and a second line-indicator marking is a broken line, and wherein those of the plurality of line indicators that have the solid line indicate a first elevation relative to the work surface and those of the plurality of line indicators that have the broken line indicate a second elevation relative to the work surface.

4. The apparatus of claim 1, wherein a first line-indicator marking is a first color and a second line-indicator marking is a second color.

5. The apparatus of claim 1, wherein a first line-indicator marking is a solid line and a second line-indicator marking is a broken line.

6. The apparatus of claim 1, wherein as image content is moved out of a field of projection from the first projector, that image content is moved into the field of projection of the second projectors.

7. The apparatus of claim 1, wherein the first controller of the first projector/camera subsystem is further configured to transmit a plurality of the received images from the first digital camera to a remote human-machine interface (HMI) unit.

8. The apparatus of claim 1, wherein both the first projection subsystem and the second projection subsystem are operatively coupled to a remote human-machine interface (HMI) unit, wherein both the first projection subsystem and the second projection subsystem are further configured:
    to receive interactively human-generated graphical information from the remote human-machine interface (HMI) unit, and
    to interactively project the human-generated graphical information onto the work surface as the workpiece is being assembled such that further input images obtained by the first digital camera include the human-generated graphical information from the remote HMI unit.

9. A method for displaying components of a workpiece, the method comprising:
projecting from a first projector a first output digital image of at least some features of the workpiece onto the work surface, wherein the first output digital image includes a plurality of line indicators including a first line indicator that has a first marking and a second line indicator that has a second marking;
obtaining with a first camera a first set of input digital images of the work surface;
projecting from a second projector a second output digital image of at least some features of the workpiece onto the work surface, wherein the second output digital image includes a plurality of line indicators including a first line indicator that has the first marking and a second line indicator that has the second marking;
obtaining with a second camera a second set of input digital images of the work surface;
controlling the projecting of the second output digital image onto the work surface stitched together with the first output digital image such that at least a portion of the first line indicator of the first output digital image overlaps at least a portion of the first line indicator of the second output digital image;
performing at least some geometric compensation on the output images based on the first and second sets of images acquired during initial and ongoing calibration procedures; and
storing distortion-correction parameters and using the stored distortion-correction parameters to adjust the projecting of the first output digital image.

10. The method of claim 9, further comprising:
operatively coupling both the first camera and the second camera to a remote human-machine interface (HMI) unit that is configured to receive interactively human-generated graphical information, and to interactively communicate the human-generated graphical information to project onto the work surface as the workpiece is being assembled such that further input images obtained by the first digital camera include the human-generated graphical information from the remote HMI unit.

11. The method of claim 9, further comprising:
automatically identifying, by the computer system, features from first set of input digital images of the work surface that happen to be part of the work surface as a plurality of identified "witness points" in three-dimensional space without added fiducial marks on the work surface; and
storing the plurality of identified witness points, wherein each of the stored witness points corresponds to a feature inherent in the work surface.

12. The method of claim 9, further comprising:
automatically identifying, by the computer system, features that happen to be part of the work surface as a plurality of at least 100 identified "witness points" in three-dimensional space without added fiducial marks on the work surface; and
storing the plurality of identified witness points, wherein each of the stored witness points corresponds to a feature inherent in the work surface.

13. The method of claim 9, further comprising:
automatically identifying, by the computer system, features that happen to be part of the work surface as a plurality of identified "witness points" in three-dimensional space without adding fiducial marks to the work surface;
storing the plurality of identified witness points, wherein each of the stored witness points corresponds to a feature inherent in the work surface; and
interpolating locations of at least a first set of the stored witness points if the first set of the stored witness points happens to be obscured in a later captured image.

14. The method of claim 9, wherein a first line-indicator marking is a solid line and a second line-indicator marking is a broken line, and wherein those of the plurality of line indicators that have the solid line indicate a first elevation relative to the work surface and those of the plurality of line indicators that have the broken line indicate a second elevation relative to the work surface.

15. One or more non-transitory computer-readable storage media that include instructions that, when executed by a computer system, cause the computer system to perform a method comprising:
projecting from a first projector a first output digital image of at least some features of the workpiece onto the work surface, wherein the first output digital image includes a plurality of line indicators including a first line indicator that has a first marking and a second line indicator that has a second marking;
obtaining a first set of input digital images of the work surface;
projecting from a second projector a second output digital image of at least some features of the workpiece onto the work surface, wherein the second output digital image includes a plurality of line indicators including a first line indicator that has the first marking and a second line indicator that has the second marking;
obtaining a second set of input digital images of the work surface;
controlling the projecting of the second output digital image onto the work surface stitched together with the first output digital image such that at least a portion of the first line indicator of the first output digital image overlaps at least a portion of the first line indicator of the second output digital image;
performing at least some geometric compensation on the output images based on the first and second sets of images acquired during initial and ongoing calibration procedures; and
storing distortion-correction parameters and using the stored distortion-correction parameters to adjust the projecting of the first output digital image.

16. The one or more computer-readable storage media of claim 15, wherein the computer system further includes a first projection subsystem that performs the method, and a second projection subsystem that performs a method substantially identical to the method performed by the first projection subsystem, wherein the one or more computer-readable storage media further comprise instructions such that the method further includes:
operatively coupling both the first camera and the second camera to a remote human-machine interface (HMI) unit that is also configured to receive interactively human-generated graphical information, and to interactively communicate the human-generated graphical information to project onto the work surface as the workpiece is being assembled such that further input images obtained by the first digital camera include the human-generated graphical information from the remote HMI unit.

17. The one or more computer-readable storage media of claim 15, further comprising:
  automatically identifying, by the computer system, features from first set of input digital images of the work surface that happen to be part of the work surface as a plurality of identified "witness points" in three-dimensional space without added fiducial marks on the work surface; and
  storing the plurality of identified witness points, wherein each of the stored witness points corresponds to a feature inherent in the work surface.

18. The one or more computer-readable storage media of claim 15, further comprising:
  automatically identifying, by the computer system, features that happen to be part of the work surface as a plurality of at least 100 identified "witness points" in three-dimensional space without added fiducial marks on the work surface; and
  storing the plurality of identified witness points, wherein each of the stored witness points corresponds to a feature inherent in the work surface.

19. The one or more computer-readable storage media of claim 15, further comprising:
  automatically identifying, by the computer system, features that happen to be part of the work surface as a plurality of identified "witness points" in three-dimensional space without adding fiducial marks to the work surface;
  storing the plurality of identified witness points, wherein each of the stored witness points corresponds to a feature inherent in the work surface; and
  interpolating locations of at least a first set of the stored witness points if the first set of the stored witness points happens to be obscured in a later captured image.

20. The one or more computer-readable storage media of claim 15, wherein a first line-indicator marking is a solid line and a second line-indicator marking is a broken line, and wherein those of the plurality of line indicators that have the solid line indicate a first elevation relative to the work surface and those of the plurality of line indicators that have the broken line indicate a second elevation relative to the work surface.

* * * * *